United States Patent
Bowerman

(10) Patent No.: US 7,478,499 B2
(45) Date of Patent: Jan. 20, 2009

(54) CHUMMER APPARATUS AS AN AID TO FISHING

(76) Inventor: Rickie Bowerman, 4170 3rd Ave. SW., Naples, FL (US) 34119

(*) Notice: Subject to any disclaimer, the term of this patent is extended or adjusted under 35 U.S.C. 154(b) by 351 days.

(21) Appl. No.: 11/222,698

(22) Filed: Sep. 12, 2005

(65) Prior Publication Data

US 2007/0056206 A1    Mar. 15, 2007

(51) Int. Cl.
*A01K 97/02* (2006.01)
(52) U.S. Cl. ...................................... 43/44.99
(58) Field of Classification Search ............... 43/44.98, 43/44.99; 222/180; 119/51.04, 56.1, 57.91
See application file for complete search history.

(56) References Cited

U.S. PATENT DOCUMENTS

| | | | | |
|---|---|---|---|---|
| 575,033 A * | 1/1897 | Lehmann | ..................... | 73/427 |
| 592,781 A * | 11/1897 | Hertwig | ..................... | 220/506 |
| 625,607 A * | 5/1899 | Rose | ..................... | 222/166 |
| 944,341 A * | 12/1909 | Marx et al. | ................. | 222/166 |
| 2,214,826 A * | 9/1940 | Ward | ..................... | 222/105 |
| 2,233,721 A * | 3/1941 | Ward | ..................... | 222/164 |
| 2,302,756 A * | 11/1942 | Ficke | ..................... | 211/78 |
| 2,463,811 A * | 3/1949 | Schulze | ..................... | 222/604 |
| 2,507,901 A * | 5/1950 | Green | ..................... | 222/166 |
| 2,678,754 A * | 5/1954 | Kirsner | ..................... | 222/100 |
| 2,700,489 A * | 1/1955 | Sheft | ..................... | 222/170 |
| 2,838,209 A * | 6/1958 | Legman | ..................... | 222/180 |
| 2,892,225 A * | 6/1959 | Buhrer et al. | ............... | 222/166 |
| 3,043,479 A * | 7/1962 | Gaukstern | ................. | 222/129 |
| 3,927,806 A * | 12/1975 | Meshberg | .............. | 222/402.12 |
| 4,138,037 A * | 2/1979 | Zehr | ..................... | 222/166 |
| 4,637,528 A * | 1/1987 | Wachinski et al. | .......... | 222/182 |
| 6,267,265 B1 * | 7/2001 | Issa | ..................... | 221/288 |

* cited by examiner

Primary Examiner—Kurt Rowan
(74) Attorney, Agent, or Firm—The Lilvingston Firm; Edward M. Livingston; Angela M. Miller

(57) ABSTRACT

The chummer apparatus is designed to lower ground or cutup fish chum onto a bottom of a body of water. The chummer apparatus consists of a U-shaped frame that supports a chum tube having the fish chum therein from an upright position and to pivot the same into an emptying position. One of the legs of the frame has a sliding release element thereon that in a lower position arrests the chum in an upright position on the frame but in an upper position releases the chum tube so that it can pivot downwardly into an emptying position.

5 Claims, 4 Drawing Sheets

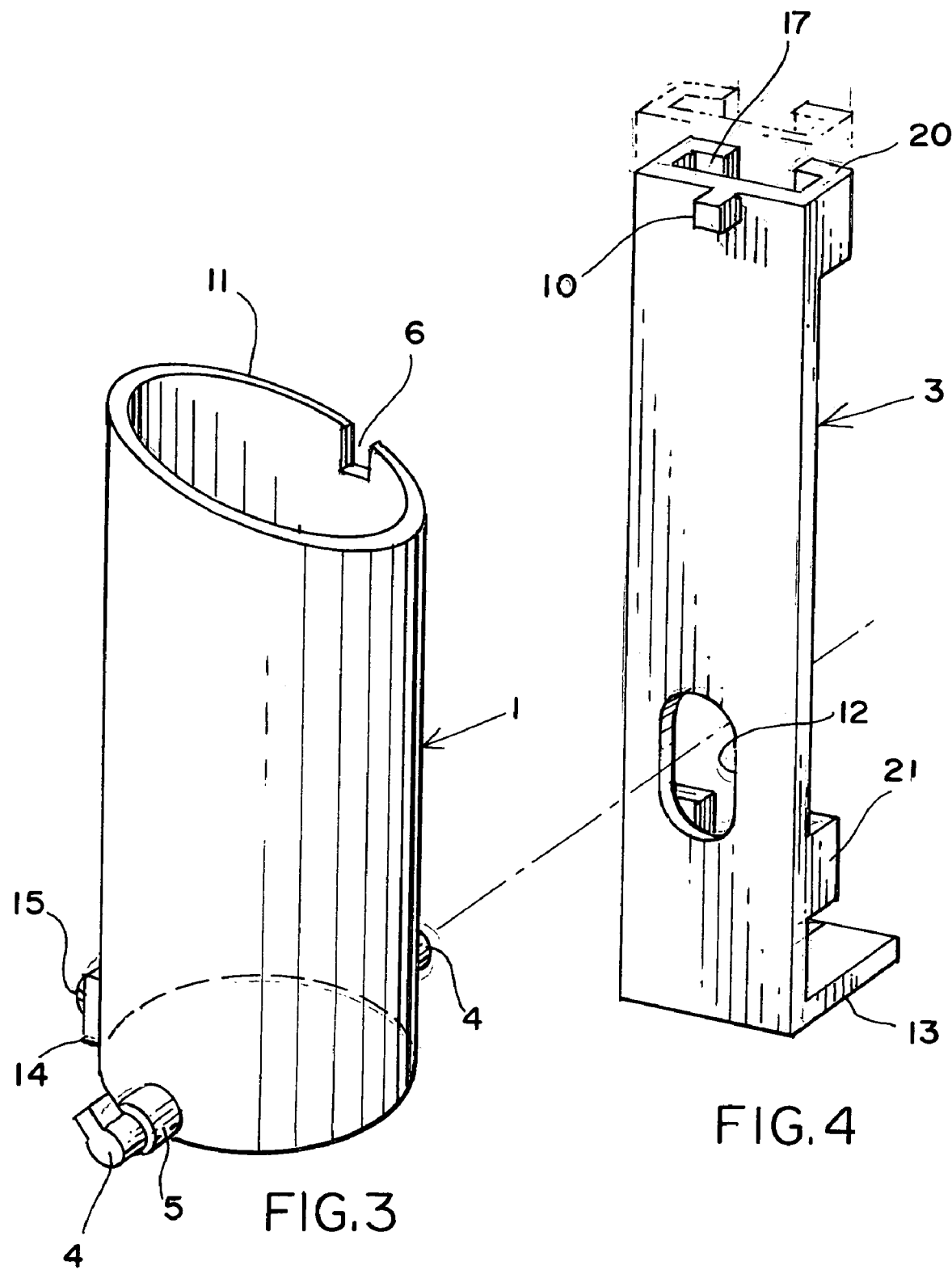

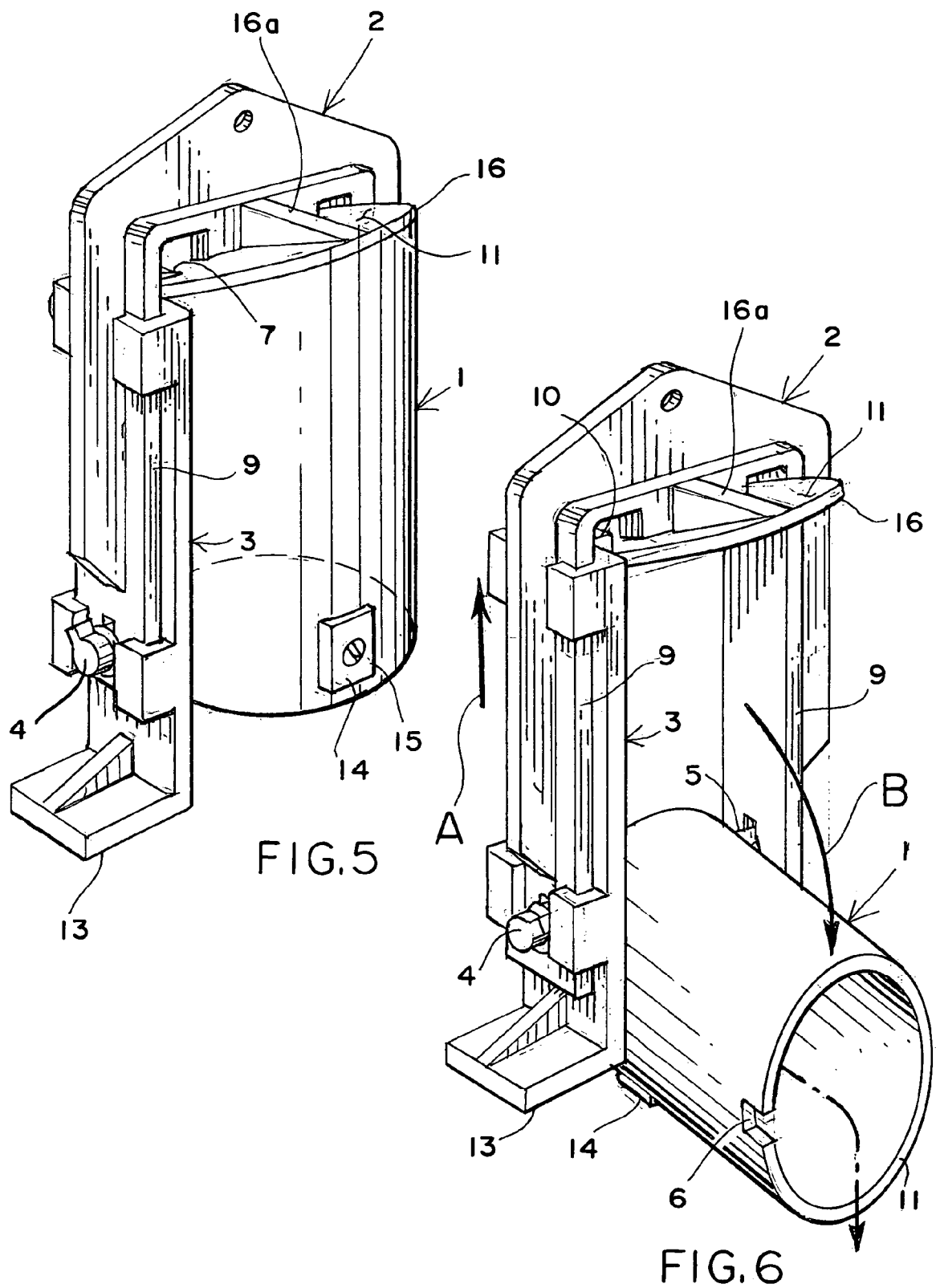

CHUMMER APPARATUS AS AN AID TO FISHING

FIELD OF THE INVENTION

The chummer apparatus is an aid for fishermen to deposit ground or cut fish particles into a certain depth and a bottom of a body of water as a bait to attract fish.

BACKGROUND OF THE INVENTION

So far the chum has just been dumped into the water on the surface of the water or a container has been lowered into the water and then overturned therein to empty the container. The chum thereby delivered is dissipated over a wide area and the various fish feed on the chum but not in the vicinity where it is most effective for the fishermen having its own bait on a line. The aim of the inventive chummer apparatus is to deliver the chum to the bottom of the water as close to the boat having the fishing lines overboard as possible.

BRIEF DESCRIPTION OF THE INVENTION

The inventive chummer apparatus aids the fishermen to deliver the chum contained in a container as close to the fishing boat as possible and at the same time at a bottom of a body water and in a controlled situation by dumping the chum in one pile. The apparatus consists of a frame that has a chum tube or container mounted thereon that can by pivoted into an emptying position when the frame hits the bottom of the body of water. The frame has a release element thereon that will automatically allow to tilt the chum tube into an emptying position when the apparatus hits the bottom of the water. Once the chum tube is emptied, the apparatus can be hauled back on board of the fishing boat and can be used over and over again.

BRIEF DESCRIPTION OF THE DRAWINGS

FIG. 3 is a perspective view of the chummer tube;

FIG. 4 is a perspective view of the release element that allows the chum tube to be pivoted into an emptying position;

FIG. 5 shows the chummer in an assembled state;

FIG. 6 shows the chummer in a chum deposit state.

DETAILED DESCRIPTION OF THE INVENTION

Figure 1:
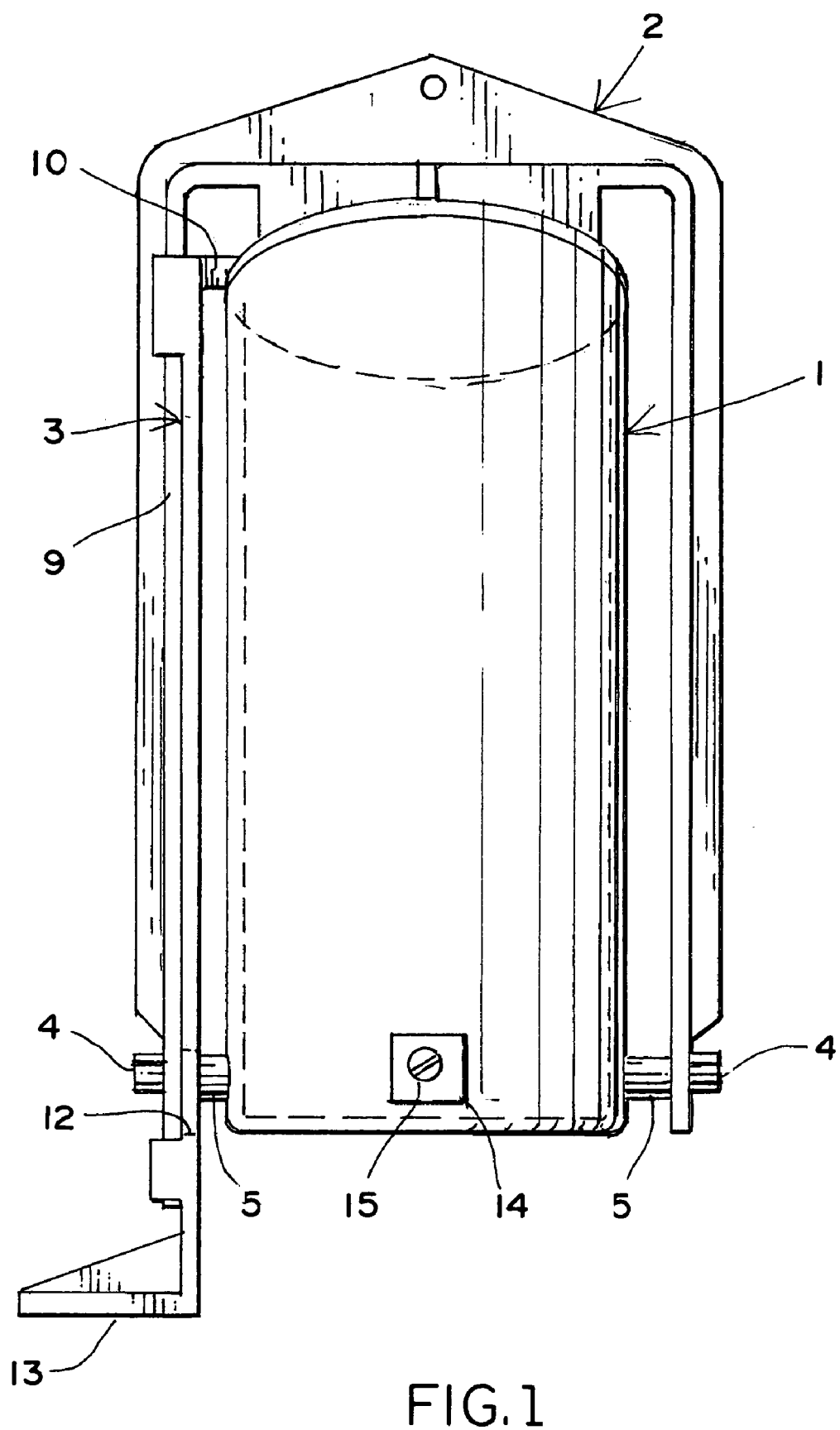
FIG. 1 shows the bottom chummer in an assembled condition.

FIG. 1 shows the chummer apparatus in a fully assembled state wherein 1 is the chum tube or container that can be tilted or pivoted out of the frame into an emptying position. The frame 2 has a U-shaped configuration that receives the chum tube within the legs of the U. At 3 is shown a trigger bar or release element that can slide relative the U-shaped frame as will be explained in more detail below. The chum tube 1 can be tilted or pivoted out of the frame 1 by way of pivot pins 5 that has a retainer key 4 thereon. The pivot pins 5 are each received in a key slot 8 (FIG. 2) when assembled into the frame 2. The purpose of the retainer key is that the chum tube 1 can only be placed into the frame 2 and removed therefrom only when the chum tube 1 is in a certain position relative to the frame 2. This assures that the chum tube 1 cannot disengage itself from the frame 2 without a manual intervention of a user.

Figure 2:
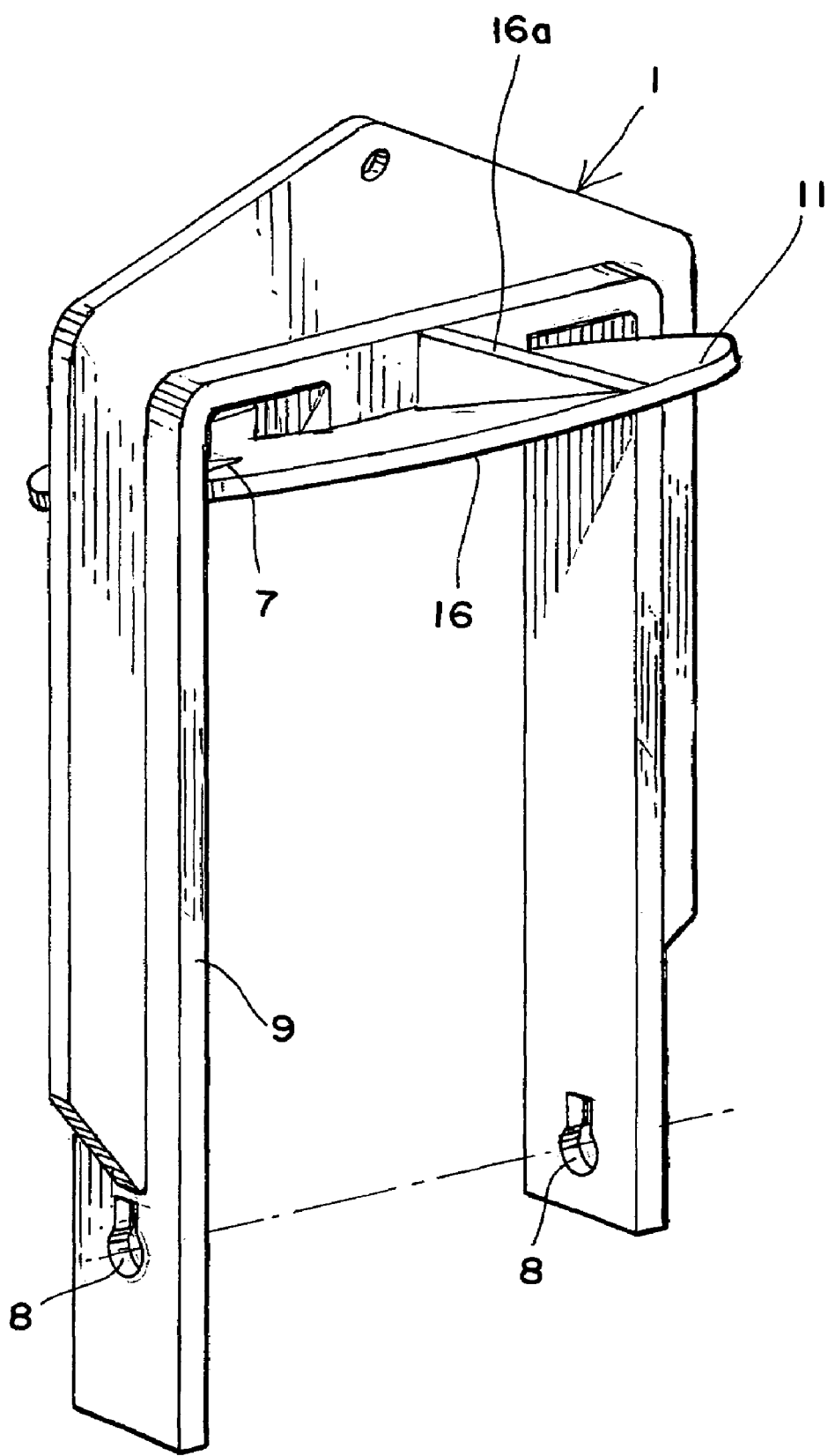
FIG. 2 is a perspective view of the frame of the apparatus.

FIG. 2 shows the U-shaped frame 2 of the apparatus by itself in a perspective view. The U-shaped frame 2 has on each of its legs a flat guide rail 9 that will receive the slide elements 17 (FIG. 4) of the release element 3. In an upper area of the Frame 2 there is a forwardly directed shelf 16 that will conform to the upper end of the chum tube 1 and will provide a cover therefor when in an assembled state. The shelf also has a reinforcing support 16a on its upper surface and also has an arresting slot 7 therein which will be engaged by a block 10 (FIG. 4) to prevent the chum tube 1 from an unintentional pivoting. The arresting block 10 also rides within the channel 7 which is cut into the shelf 16 at an appropriate location. This can be seen in FIG. 5 where it is engaged in the shelf 16 and being engaged in the slot 6 (FIG. 3) of the chum tube 1. Additionally, the shelf is slanted upwardly as shown by 11 the purpose of this slant will be explained in combination with FIG. 5.

FIG. 3 shows the chum tube 1 in a perspective view. The upper end of the tube 1 is shown with the slant 11 thereon and the arresting slot 6. At the bottom of the tube 1 there is shown a magnet 14 with a mounting screw 15. The magnet is just about in a horizontal line with the pivot pins 15. The function of the magnet 14 will be explained below.

FIG. 4 illustrates the release element or trigger bar 3 in detail. The release element 3 has upper and lower guide channels 20 and 21 thereon. These guide channels 20 and 21 surround one of the flat legs 9 of the U-shaped frame 2. The guide channels 20 and 21 guide the release element 3 on the flat leg 9 in an up and down manner. The up and down movement of the release element 9 is restricted by the elongated limit slot 12. The respective pivot pin 5 rides in the limit slot 12 once the chummer apparatus is fully assembled to prevent the release element 3 from falling out of the frame 1. FIG. 4 also shows the limit block 10 which will engage within the slot 6 of the chum tube 1 when in assembled state.

FIGS. 5 and 6 illustrate the operation of the chummer apparatus. As can be seen in FIG. 5 the chummer apparatus is in a fully assembled state or condition. The frame 2 has the chum tube 1 assembled therein in an upright position. The release element 3 is in its lowest position whereby the block 10 is engaged in the slot 6 in the chum tube 1 while being guided in the guide channel 7 in the shelf 16. The upper slanted shelf 16 at 11 matches the upper slanted top of the chum tube 1 and acts as a cover therewith. Also in FIG. 5 there is shown the weight 14 held in place by screw 15. Turning now to FIG. 6 which shows the chum tube 1 in an emptying position. This position was achieved, because, when the chummer apparatus was lowered to the bottom of the water body, the foot 13 of the release element 3 hit the bottom of the water first to cause it (3) to slide upwardly, see arrow A, whereby the block 10 slides out of the slot 6 in the chum tube 1. Because of the presence of the weight 15 at the bottom of the chum tube 1, the chum tube is forced to rotate about the pivot pins 5, see arrow B, and the contents in the tube 1 will be spilled at that location.

The individual components of the chummer apparatus should be made from a plastic material such as PVC. Because of its durability the chummer apparatus can be used over and over again.

The invention claimed is:

1. A chummer apparatus as an aid to fishermen comprising a U-shaped frame having two legs, a means for pivotably supporting a chum tube thereon, a slideable release element is mounted on one of the legs of the U-shaped frame, said slideable release element having a first means thereon for arresting said pivotably mounted chum tube in an upright positions and further having a second means thereon for releasing said chum tube to pivot into an emptying position when said chummer apparatus hits a bottom of a body of water, wherein:

said first means for arresting said chum tube in an upright position includes a block on said slideable release element which block is engaged in a slot in a top circumference of said chum tube.

2. The chummer apparatus of claim 1, wherein:

said second means for releasing is a bottom extension on said slidable release element adapted to hit the bottom of the body of water to thereby push said slidable release element into an upward position.

3. The chummer apparatus of claim 1, said chum tube having an upper slanted opening to thereby form an elliptical opening.

4. The chummer apparatus of claim 3, said frame having a shelf at an upper end thereof, said shelf is slanting away from a horizontal plane to form a cover to cover said chum tube when said tube is in an upright position.

5. The chummer apparatus of claim 1, said chum tube having a weight at a lower end thereof as an aid to pivot said chum tube into an emptying position.

* * * * *